April 6, 1971 R. B. EAVES Re. 27,112

PHOTOGRAPHIC METHOD

Original Filed Jan. 15, 1963

INVENTOR
ROBERT B. EAVES
BY Fishman & Van Kirk
ATTORNEY

United States Patent Office

Re. 27,112
Reissued Apr. 6, 1971

27,112
PHOTOGRAPHIC METHOD

Robert B. Eaves, Wayne, Pa., assignor to Photo Motion Corporation, Norristown, Pa.

Original No. 3,295,915, dated Jan. 3, 1967, Ser. No. 251,602, Jan. 15, 1963. Application for reissue Dec. 5, 1968, Ser. No. 786,499
Int. Cl. G03c *5/04*
U.S. Cl. 96—27 5 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus and method for photographic animation in which a multi-axis polarizing screen is provided with multiple images. Illumination through a selectively changing polarizing medium recreates the images in a selected manner to create the illusion of motion.*

This invention relates to a photographic method *and apparatus,* particularly intended for the animation of still photographic transparencies.

It is among the objects of the present invention to provide a photographic method *and apparatus* comprising illuminating a still object, directing light from the object through a plane polarizing first screen and thereafter through a group of similarly polarized zones exclusively of a second screen having diversely polarized zones, and forming a real image of the object on a photographic emulsion adjacent to the second screen, then shifting the first screen to cause its plane of polarization to correspond with the direction of a second group of similarly polarized zones of the second screen, and forming a real image of a similar still object displaced from the first, on the emulsion through the screen, and then developing the emulsion to produce a photographic image. The second screen may have at least three groups of diversely polarized zones and the first screen will then be shifted repeatedly to cause its plane of polarization to correspond with the direction of each additional group of similarly polarized zones of the second screen, and a third (or more) real image of a similar still object displaced from the first and second will be formed on the emulsion through the screens before the emulsion is developed.

It is also contemplated that the developed photographic image will be disposed adjacent to the second screen and in the same position relative to the polarized zones as before development of the emulsion, then illuminating the image and directing light therefrom through the second screen to an observation plane, disposing a plane polarizing screen intermediate the source and observation plane, and shifting the plane polarizing screen to transmit light from the polarized zone successively so as to produce the illusion of movement.

A more complete understanding of the invention will follow from a description of the accompanying drawings wherein.

Figure 1:
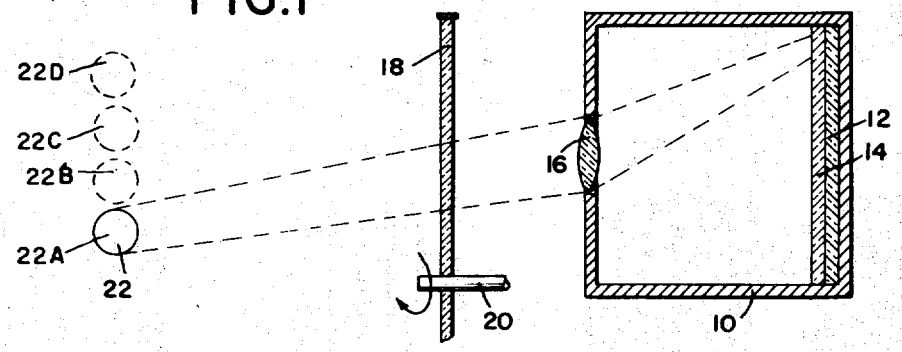
FIGURE 1 is a digrammatic representation of the manner in which a composite image is produced on a layer of photographic emulsion for subsequent development.
Figure 2:
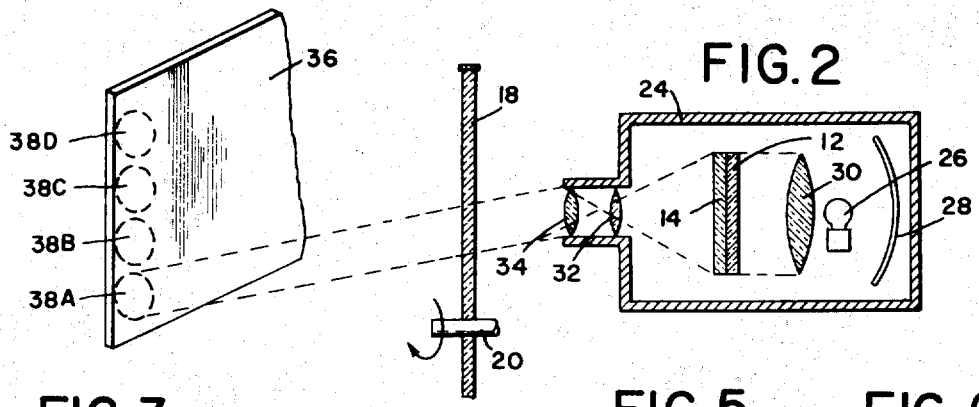
FIGURE 2 is a diagrammatic representation of the manner in which the composite image on the developed transparency is projected for viewing.

A camera 10, as shown in FIGURE 1, is depicted as containing a photographic emulsion coated film 12 disposed closely adjacent to a screen 14 having diversely polarized zones, through which the film 12 will be exposed by light admitted by a lens 16. A plane polarizing screen 18 is imposed in the path of light entering the camera, and the screen 18 is depicted as mounted on a shaft 20 as a convenient arrangement for sequentially shifting the screen so that light transmitted thereby will sequentially be transmitted by the respective zones of the diversely polarized screen 14.

Figure 3:
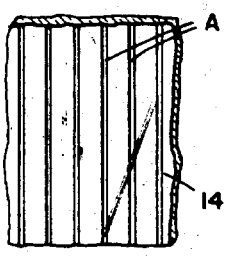
FIGURES 3, 4, 5 and 6 are fragmentary representations of the steps involved in producing a screen having diversely polarized zones for use in practicing the invention.
Figure 4:
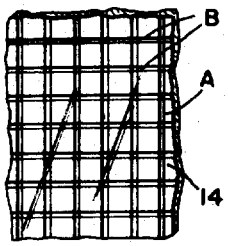
Figure 5:
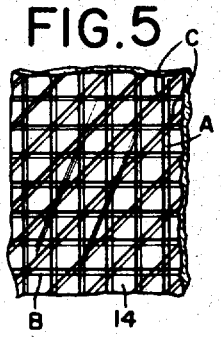
Figure 6:
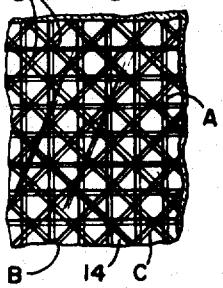

An object 22 to be photographed has been depicted in full lines in its initial position denoted 22A. In this position, the screen 18 will assume a position such that light transmitted thereby will also be transmitted solely by the zones A of the screen 14, as indicated in FIGURE 3. The emulsion carried by the film 12 will be exposed to such light. Then the screen 18 will be shifted so that the light transmitted thereby will also be transmitted through the zones B of the diversely polarized screen 14, with the object also shifted to its position denoted 22B. The emulsion carried by the film 12 will then be exposed a second time.

Where the diversely polarized screen is provided with a third zone C, as shown in FIGURE 5, the object will be moved to another position denoted 22C, and the screen 18 will be shifted so that light transmitted thereby will be transmitted exclusively by the zone C of the screen 14 to further expose the film 12. Where the screen 18 is provided with zones D as depicted in FIGURE 6, the object 22 will be shifted to its position denoted 22D and the screen 18 will be shifted until light transmitted thereby will be transmitted exclusively by the zones D of the screen 14 to further expose the film 12. The film can be produced by contact printing techniques without the use of a camera where the object assumes the form of a series of transparencies sequentially employed to expose the emulsion.

After the film 12 has been developed as a positive, the resulting transparency can be introduced into a projector 24 having a light source 26 and a reflector 28, together with suitable lenses 30, 32 and 34. The developed film 12 is placed adjacent to the diversely polarized screen 14 so as to register with it in the same manner in which the registration existed during the exposing operation. Light transmitted by the projector 24 will pass through a plane polarizing screen 18, which can be shifted by rotation or otherwise so that its lines of light transmission will correspond successively with those of the screen 14. In this way, images will be produced on an observation plane or screen 36 to produce an illusion of motion as the images sequentially assume the positions denoted as 38A, 38B, 38C and 38D.

Figure 7:
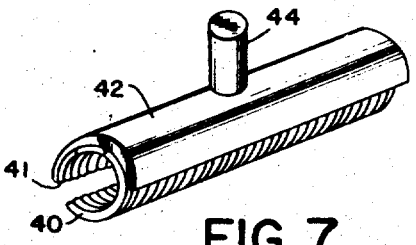
FIGURE 7 is a perspective view of a tool suitable for producing the desired polarization in a screen having such diversely polarized zones.
Figure 8:
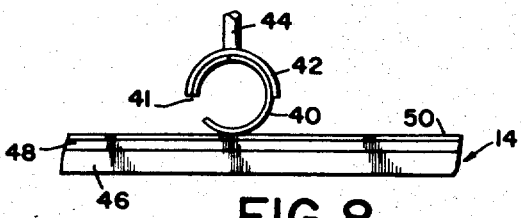
FIGURE 8 is an end elevation depicting the manner in which the tool is applied to the material from which such a diversely polarized zone screen is to be produced.

A suitable tool for producing such a diversely polarized screen as depicted in FIGS. 3, 4, 5 and 6, has been illustrated in FIG. 7. A length of music wire is shown as having been helically wound to produce a spring 40 with adjacent convolutions in contact. A holder 42 of substantially semi-circular cross section receives the spring 40 to which it is secured by means of an adhesive or in any other suitable fashion. Then, after the spring has been securely fastened in the holder, a longitudinal slot 41 is made to remove a portion of each convolution, thus defining a plurality of adjacent springs, each of substantially C-shape. The tool can be manipulated by the provision of one or more handles 44. The diversely polarized screen 14 may include a reinforcing backing lamination 46, such as a sheet of cellulose acetate having a thickness of the order of 0.006 inch. A layer of polyvinyl alcohol 48 capable of polarizing light is secured to the cellulose acetate sheet and this polyvinyl alcohol layer may have a thickness of the order of 0.002 inch. The layer 48 may be stained with a 35% water solution of Vectograph ink, produced by Polaroid Corporation, or a water solution of iodine, potassium iodide, or other substance or composition of substances lending themselves to the production of the polarizing effects required.

The tool will first be drawn along the screen 14 to produce polarized areas A as depicted in FIG. 3 composed of parallel and linear zones. To produce the polarized areas B arranged as in FIG. 4, the tool or screen will be shifted through 90° and the operation repeated to produce the zones B. To produce the zones C as depicted in FIG. 5, the path of the tool will be at an acute angle to the zones A and B. To produce a fourth set of zones D as depicted in FIG. 6, the operation will be repeated with the movement of the tool in a direction different from those previously followed. It will be understood of course, that additional zones can be produced by moving the tool along the screen at different angles. In moving the tool across the screen, friction is applied so as to produce an operation having somewhat the effect of burnishing. The coating material 50 such as the Vectograph ink, iodine, or the like, previously referred to will not be removed from the screen during the application of the tool, but by virtue of the friction applied, orientation of the molecules of the polyvinyl alcohol will occur, with the result that polarization of the stain will be produced very effectively. It has been observed that where intersections of the zones occur, the zones applied last will determine the direction of polarization.

Whereas the tool may be formed in a variety of ways, very satisfactory results have been achieved where the wire has a diameter of 0.028 inch, where the helix has a diameter of approximately 1 inch with the convolutions in contact and where the helix projects beyond the holder for about one-half of its diameter. In utilizing the tool, a vertical force that reduces the diameter of the helix by one-sixteenth of an inch will generate parallel lines having a width of approximately 0.0035 inch with a separation of approximately 0.028 inch. Depending upon the line width, and spacing desired, it may be desirable to make more than one pass of the tool across the screen in a given direction. For example, after the first pass of the tool to produce the zones A of FIG. 3, the tool may be displaced in the direction of its own axis a distance of 0.0035 inch and a second pass effected so that each pair of parallel lines will be 0.007 inch wide and 0.028 inch apart, center to center. A third pass can be made so that there are now three parallel lines in each group, each such group being 0.0105 inch wide and 0.028 inch apart, center to center. Then a fourth or further pass can be made in the same fashion until the entire area has been burnished. The production of finer and closer lines is limited only by the production cost of tools and of the equipment to operate such tools. After the screen has been polarized in one direction as described with respect to the zones A, subsequent burnishing is similarly effected at desired angles thereto to produce one or more of the zones B, C, D, etc. As previously stated, where such zones intersect, the polarization will be in the direction of the zone last formed.

A line width of 0.003 inch appears to be a practical one, since an enlargement of eighteen times would produce a line of 0.054 inch with a maximum spacing of the order of seven thirty-seconds of an inch.

Whereas only one specific form of the invention has been described with reference to the accompanying drawings, the details and numerical values have been specified for purposes of example only and are not to be construed as limiting the invention beyond the scope of the appended claims.

I claim:

1. A photographic method comprising illuminating a still object occupying a first position, directing light from said object through a plane polarizing first screen and thereafter through a group of similarly polarized zones exclusively of a second screen having diversely polarized zones and forming a real image of said object on a photographic emulsion adjacent to said second screen to expose said emulsion, then shifting said first screen to cause its plane of polarization to correspond to the direction of a second group of similarly polarized zones of said second screen, placing a similar still object in a second position spaced from said first position, and forming a real image of said similar still object on said emulsion through said screens to again expose said emulsion, then developing said emulsion to produce a photographic image, disposing said developed photographic image adjacent to said second screen and in the same position relative to said polarized zones as before development on said emulsion, illuminating said image and directing light therefrom through said second screen to an observation plane, disposing a plane polarizing screen intermediate said source and observation plane, and shifting the last said screen to transmit light from said polarized zones successively.

2. A photographic method according to claim 1 wherein said second screen has at least three groups of diversely polarized zones and said first screen is shifted to cause its plane of polarization to correspond to the direction of a third group of similarly polarized zones of said second screen, and a third real image of a similar still object displaced from said first and second positions is formed on said emulsion through said screens to again expose said emulsion before said emulsion is developed.

*3. A photographic animation method including the steps of:*

*forming a polarizing screen having diversely polarized zones angularly disposed with respect to each other;*

*locating a layer of light responsive emulsion on one surface of said screen;*

*defining a plurality of images to be displayed;*

*generating a sequence of polarized light outputs from said images having directions of polarization commensurate with said diversely polarized zones;*

*selectively exposing the emulsion through said polarizing screen to form areas of transmission of polarized light of different directions commensurate with said images;*

*developing said emulsion to produce photographic images; and*

*delivering display illumination to said screen, said display illumination being polarized and having a varying axis of polarization, whereby said images are displayed in a predetermined order.*

*4. The photographic animation method of claim 3 wherein the step of forming said polarizing screen includes:*

*burnishing the screen in a first direction;*

*then burnishing the screen in a second direction, said second burnishing including overlapping previously burnished parts.*

*5. The photographic method as in claim 4 including the further step of:*

*burnishing the screen in a third direction, said third burnishing including overlapping previously burnished parts.*

References Cited

The following references, cited by the Examiner, are of record in the patented file of this patent or the original patent.

UNITED STATES PATENTS

| | | | |
|---|---|---|---|
| 1,260,682 | 3/1918 | Kanolt | 96—41 |
| 2,309,626 | 2/1943 | Conrad | 88—65 |
| 2,317,875 | 4/1943 | Athey et al. | 88—65 |
| 2,977,845 | 10/1955 | Boone | 96—40 |

GEORGE F. LESMES, Primary Examiner

R. E. MARTIN, Assistant Examiner

U.S. Cl. X.R.

96—40; 352—45, 46; 350—147, 149, 153